United States Patent [19]

Oks

[11] Patent Number: 5,505,241

[45] Date of Patent: Apr. 9, 1996

[54] TIRE PRESERVATION DEVICE

[76] Inventor: Ricardo M. Oks, Oro 2996 Capital (1425), Buenos Aires, Argentina

[21] Appl. No.: 333,551

[22] Filed: Nov. 2, 1994

[51] Int. Cl.⁶ .................................................. B60C 17/04
[52] U.S. Cl. .......................................... 152/158; 152/520
[58] Field of Search .................................. 152/152, 155, 152/156, 157, 158, 516, 520, 513

[56]  References Cited

U.S. PATENT DOCUMENTS

| | | | |
|---|---|---|---|
| 4,334,565 | 6/1982 | Stokes | 152/158 |
| 4,592,403 | 6/1986 | Stein et al. | 152/158 |
| 4,641,670 | 2/1987 | Pogue et al. | 152/520 X |
| 4,953,291 | 9/1990 | Markow | 152/520 X |
| 5,012,849 | 5/1991 | Ko | 152/520 |

*Primary Examiner*—Michael W. Ball
*Assistant Examiner*—David W. Reed
*Attorney, Agent, or Firm*—Alfred Walker

[57]  ABSTRACT

A device located within the tubeless tire wall of an automobile tire, capable of preserving this tire wall from the deterioration caused by its own rim, and making it possible for the vehicle to continue rolling even when said tire loses all the air contained in its interior. The device is characterized by a partially flexible ring-shaped nucleus within the tire, attached to the tire rim and adjustably positioned over the central zone of the tire rim. Obliquely projecting flexible wings rise from the base of the ring-shaped nucleus. Each wing has a projecting ring-shaped edge at the side. When the tire is in an uninflated state, the height of the central nucleus is greater than the height of the sum of the tire rim and the thickness of the folded uninflated tire sides. Each wing interposes into the space defined by the folded side walls of the uninflated tire, and the ring shaped edge maintains engagement of the bead with the rim.

2 Claims, 2 Drawing Sheets

TIRE PRESERVATION DEVICE

The present patent of invention relates to a new device capable of making it possible for a vehicle to continue rolling and preserving the casings of its tires, in the event of a total or partial loss of the air from the interior of same.

More concretely, the present invention covers a device applicable to tubeless tires, particularly tubeless tires for automobiles.

PRIOR ART

It is known that when a tire loses the air contained in its interior it deflates and flattens.

In particular, modern automobiles are equipped with tubeless tires of relatively broad footprint, so that an automobile driver is confronted with two potential problems:

It is not always feasible to notice in due time that a tubeless tire has lost its inflation, so that the tire casing continues rolling in its flattened condition; consequently, the tire rim presses against its fabric, cutting and damaging it beyond repair.

Still more dangerous is the possibility of a sudden loss of air in tubeless tires: in this case (such as a blowout, broken bead, etc.), this circumstance may have fatal consequences at relatively high speeds, for known reasons, and in the case of broken bead, an accident is inevitable if the tire does not have a tube. "Broken bead" or "unshoeing" is the phenomenon caused when the tire loses adhesion to the edge of the rim. When this occurs, the air in the interior is instantly lost, sometimes accompanied by a complete separation of the tire from the tire rim.

Various constructions and solutions to the problem caused by loss of air from a tubeless tire are known in the art.

One may cite the following procedures as examples of partial solutions to the problem, consisting in keeping a damaged and at least partially deflated tubeless tire rolling.

One example concerns injection of air from a compressor (or source of air under pressure) permanently connected to the tire. This solution solves the problem caused by small punctures or very gradual losses of air; it is very costly, and even then blows out the tire or separates from the rim with the vehicle at high speed.

Another example concerns the introduction of sealing solutions within the tire. This is also useful for covering gradual losses of air, such as a puncture, but it does not solve the problem of multiple punctures, cuts, blowouts, etc. and broken beads.

A further example concerns the introduction of a diaphragm inside the tire, which acts as a kind of inner tube. Argentine Patent AR133,987 clearly exemplifies this solution, but it does not solve the broken bead problem.

Another example involves placing a rigid wheel in one piece with the rim and outside it, of smaller diameter than the inflated tire and of greater diameter than that of the rim .on which said tire is placed. When the wheel deflates, the vehicle rests on this plate. The difficulties encountered were: low mechanical resistance; difference in ground movement, since this rim tends to become fixed; since it is a rigid rim, it does not match the elasticity of the tire and produces blows against the shock absorbers.

Yet another example involves insertion of a number of gas cartridges capable of being activated when the wheel deflates inside the chamber. This solution, provided by DUNLOP of the UK, serves only for relieving the difficulties of limited punctures.

OBJECT OF THE PRESENT INVENTION

The object of the present invention is a partially flexible device located in the interior of the tubeless tire of an automobile and connected to the tire rim, capable of preserving said tire from the deterioration caused by its own rim when said tire deflates, making it possible for the vehicle to continue rolling, accompanying the deformation of the deflated tire in a partially flexible way, introducing portions of ring-shaped wings into the fold of the deformed tire wall, restoring a tire profile equivalent to a partially filled tire, simulating a tire which has been partially inflated, even when all the air contained in its interior has been lost, avoiding cutting action by the edge of the tire rim on said tire against the ground, and at the same time providing a rigid ring-shaped body of greater diameter than that of the tire rim, and on which the corresponding axle end of the vehicle is positioned. Another object of the present invention is a device which, apart from the above cited advantages, specifically avoids broken beads on the tubeless tire.

SUMMARY OF THE INVENTION

It was found that all these objectives are readily attained in a tubeless tire presenting a doughnut-shaped space in the inflated state, whereas in the deflated state it presents its side walls folded over themselves and positioned between the tread and the rim ring. These objectives are readily obtained if a tire has a partially flexible body within said tire wall, permanently connected to the tire rim of the tubeless tire. The partially flexible body having a ring-shaped expansion of constant cross-section, formed by a central nucleus substantially undeformable under compound bending and compression stresses, whose inside diameter is adjustably positioned over the central zone of the tire rim; presenting an obliquely rising projecting wing at each side of said central nucleus, from adjacent to the base of same up to the corresponding space side each of said wings is flexibly deformable up to the tire rim, and with a substantially equal length interposed into the space defined by the folded side walls of the tire in uninflated state, resulting in a tire in uninflated state whose side walls define a curvature whose height is greater than that of the tire rim. Each wing has a projecting ring-shaped edge at the side. The lug of the corresponding space side is interposed and enclosed between said ring-shaped edge and the tire rim, in an uninflated tire state. The height of the central nucleus is greater than the height of the sum of the tire rim and the thickness of the fold of the uninflated tire side.

DESCRIPTION OF THE DRAWINGS

To concretely present the present invention by means of an execution example not limiting the scope of same, the present invention is illustrated in the attached illustrative drawings, in support of the following specification, with the statement that, since execution examples are involved, it is not correct to assign a limiting character to same.

DETAILED DESCRIPTION OF THE PREFERRED EMBODIMENT

The same references identify the same elements in all figures.

Figure 1:
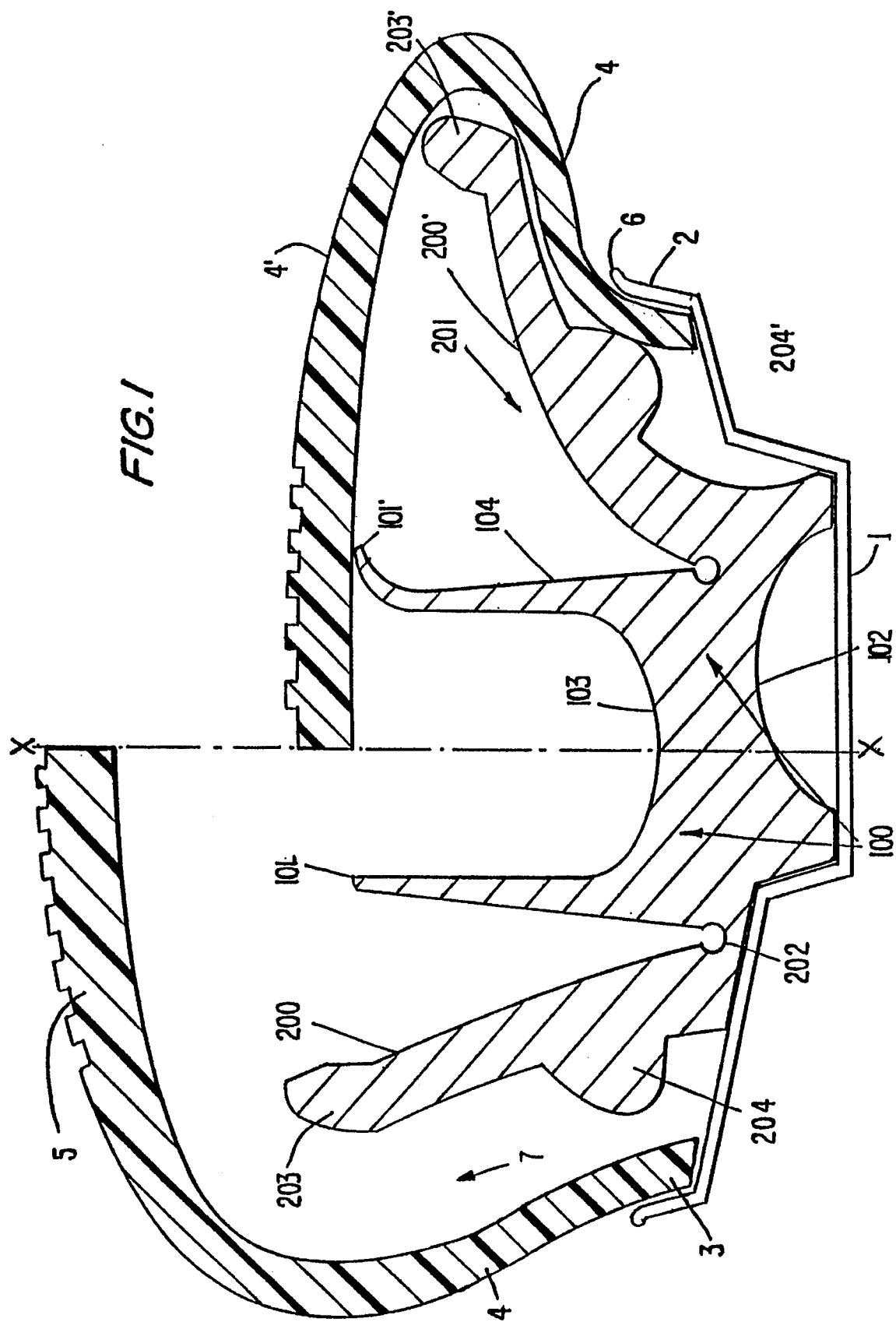
FIG. 1 shows in section, in its left part, an inflated tubeless tire mounted on a rim, with the object of the present invention in inoperative position, and in the right part of the same drawing, the section of the uninflated tire, with the object of the invention in operative position.
Figure 2:
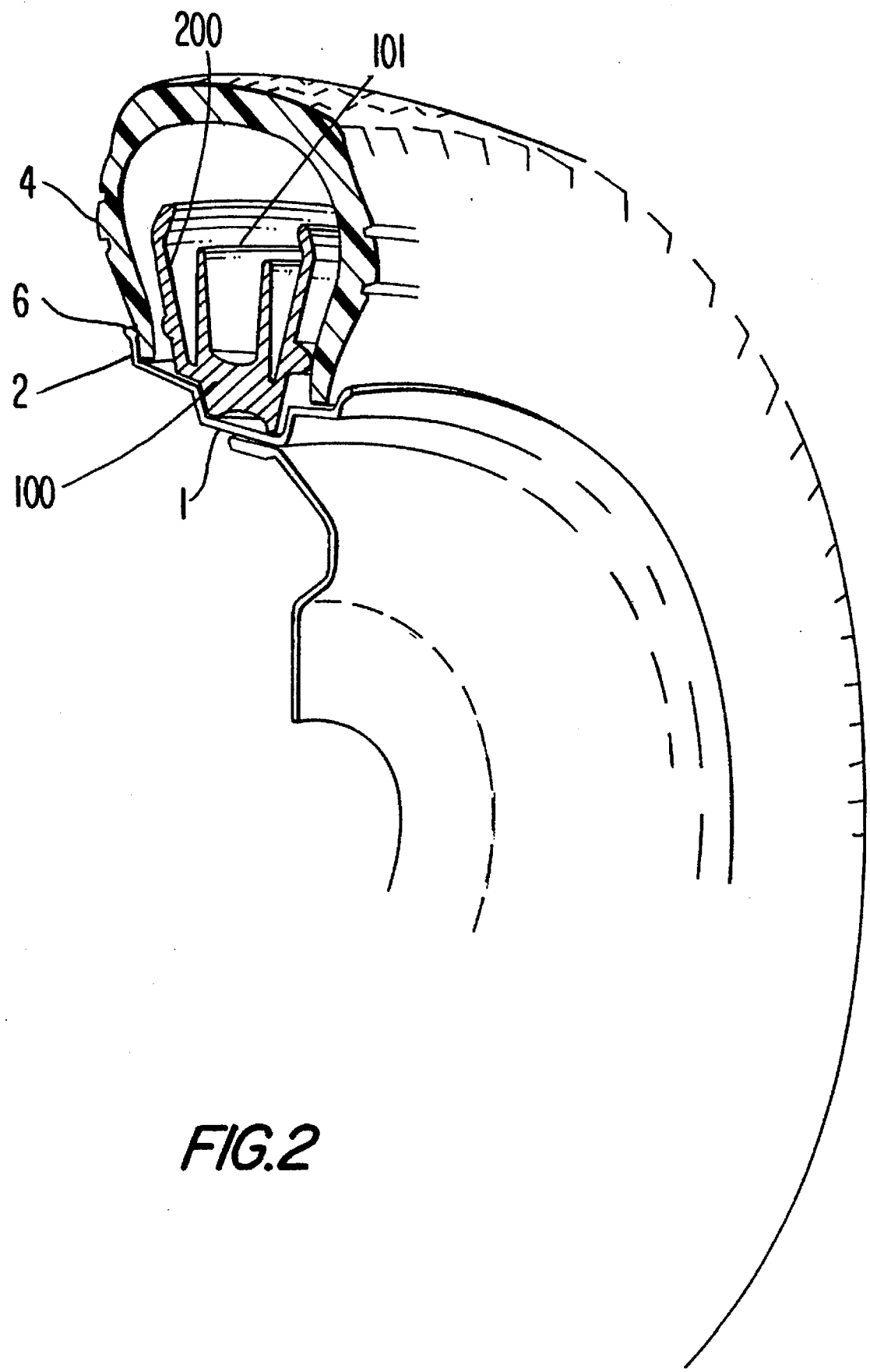
FIG. 2 shows a partially sectioned inflated tire in perspective, with the object of the invention in its interior.

In FIG. 1, the base of the rim is indicated by (1), with (2) the sides of same; (3) indicates the lug of each side (4) of the tire; (5) is the tread. These elements (1–5) are generic and are indicated only as reference marks.

The present invention is characterized by having a partially flexible ring-shaped body within the volume defined by the tire, permanently connected to the tire rim of the tubeless tire, said body having a ring-shaped expansion of constant cross-section, formed by central nucleus (100). This central nucleus (100) defines a type of rigid central column substantially arranged in plane of symmetry XX' of the space and rim, with its end edges (101) slightly flexible; the central nucleus is substantially undeformable under compound compression and bending stresses, whose inside diameter (102) is adjustably seated over the central zone of tire rim (1). To relieve the weight and provide a correct distribution of the incident load, it is suitable for this column to present central pit (103) and two ring-shaped backs (101), the free ends of (101) being partially flexible, whereas the remainder of this central nucleus (100) acts as a quite rigid column. Projecting wing (200) projects in obliquely ascending manner on each side (104) of the central nucleus, from adjacent to the base of same up to the corresponding side (4) of the space, each of said wings being flexibly deformable up to said tire rim (2), with substantially equal length and interposed in space (201) defined by the folded side walls of the tire (4') in uninflated state.

In FIG. 1, the simple references indicate that the present invention is in rest state (left part of the figure), whereas (') notations show the invention in operative conditions, i.e., with the uninflated tire.

Each wing (200) presents a spin axis at its union (202) with side (104). Wings (200) are elastically deformable and present a body of thickness such that, on being interposed in space (201), they avoid the flattening of the tire and cause same to adopt a curvature in its side walls (4') such as to prevent edge (6) of the side of rim (2) from cutting it like a knife, such,as currently takes place.

End (203) of the wing preferably presents a ring-shaped enlargement which increases the curvature of the fold of side (4').

The present invention resolves the problem of the bead bending or unshoeing of the wheel.

When the covering loses its air, this causes its beads (3) to lose adhesion to rim (2), which contributes to the rapid destruction of the covering.

The present invention resolves this problem, by creating a wedge between the wing and the lug of covering (3).

FIG. 1 shows wing (200) at rest (inflated tire) in its left part. The wing presents ring-shaped edge (204) which, when the wing bends downward (as shown in the right part of FIG. 1), causes this ring-shaped edge (204') to press bead (3) of the tire firmly against its rim (2).

FUNCTIONING OF THE INVENTION

According to the present invention, a rim which is retained by its ring-shaped base (102) to tire rim (1) is placed within the tubeless tire, which is then inflated.

While the tire remains inflated, this device does not alter the functioning and response characteristics of the tire.

When a puncture occurs, the profile of the tire adopts a flattened profile, as is shown in the right part of FIG. 1 and, according to the present invention, sides (4') fold, enclosing in their interior wing (200), which is flexible and bends at its base (202). It is suitable for this ring-shaped wing to present a thickness sufficient to avoid vibration during the normal movement of the tire and sufficiently thin to permit its continuous flexibly elastic deformations. It may have a ring-shaped thickened edge (203) at its free end, which allows folds (4') of the side of the tire wall to attain a thickness and curvature sufficient to make sure that the free edge (6) of the tire rim does not cut the fabric of the wall.

In its turn, central nucleus or column (100) presents a height such as to permit the inside surface of rolling band (5) of the tire wall to rest against same, providing sufficient support at height such as to guarantee a curvature in the side wall of the tire.

All this is achieved without interfering with the assembly of the wheel, since the width of this ring-shaped device is such as to leave a space (7) at each side free when the tire wall is in place.

Of fundamental importance is the action provided by ring-shaped edge (204) in creating a wedge which holds the internal side of bead (3) of the tire wall against ring (2) of the rim to prevent unshoeing of the tire, precisely when it is most necessary to exert a uniform force against same.

It is known that the danger for tubeless tires is their bead breaking or unshoeing when they lose air, as has already been explained.

The present invention avoids this by creating a uniform, annular wedging force, created by this part ( 204 ) on rotating in (204') and pressing from above downward and sideward on lug (3) of the tire wall.

Other modifications may be made to the present invention without departing from the spirit and scope of the invention, as noted in the appended Claims.

Having illustrated and exemplified the object of the present invention, exclusive property is claimed for:

1. A device located within the tubeless tire wall of an automobile tire, capable of preserving this wall from the deterioration caused by its own rim, and making it possible for the vehicle to continue rolling, even when the tubeless tire loses all the air contained in its interior, of the tubeless tire, which, in an inflated condition, the tire presents a doughnut-shaped space, whereas in a deflated state the tire presents its side walls folded over themselves and in a position between the ground and the rim ring, comprising a partially flexible body within said tire wall said partially flexible body being permanently connected to the tire rim of the tubeless tire, said partially flexible body having a ring-shaped expansion member of constant cross-section, said member being formed by a central nucleus portion, said central nucleus portion being substantially undeformable under compound bending and compression stresses, said flexible body further having an inside diameter portion, said inside diameter portion being adjustably seated over a central zone portion of the tire rim; said flexible body presenting an obliquely rising projecting wing at each side of said central nucleus portion, each said wing rising from adjacent to a base of said central nucleus portion up to a corresponding space side, each of said wings being flexibly deformable up to the tire rim, and each said wing having a substantially equal length portion interposable into a space defined by the folded side walls of the tire in an uninflated state, resulting in a tire in an uninflated state whose side walls define a curvature whose height is greater than that of the tire rim; each said wing having a projecting ring-shaped edge at each side, a bead of said corresponding space side of each said wing being interposed and enclosed between said ring-shaped edge and the tire rim, in an uninflated tire state; said central nucleus having a height greater than the height of the sum of the tire rim and the thickness of the fold of the side of the uninflated wall of the tire.

2. Device in accordance with claim 1, further comprising said flexible body having two parallel and separate ring-shaped backs comprising said central nucleus portion, each said back having an edge being partially flexible, and the rest of said body of said nucleus portion being more rigid and undeformable than said edge of said back of said central nucleus portion.

* * * * *